United States Patent
Amante et al.

(10) Patent No.: US 11,634,216 B2
(45) Date of Patent: Apr. 25, 2023

(54) DUCTED FAN ASSEMBLY FOR AN AIRCRAFT

(71) Applicant: Bell Textron Inc., Fort Worth, TX (US)

(72) Inventors: William Anthony Amante, Grapevine, TX (US); Timothy Brian Carr, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 9 days.

(21) Appl. No.: 17/036,798

(22) Filed: Sep. 29, 2020

(65) Prior Publication Data

US 2022/0097838 A1 Mar. 31, 2022

(51) Int. Cl.
*B64C 29/00* (2006.01)
*B64C 11/00* (2006.01)
*B64C 27/20* (2023.01)

(52) U.S. Cl.
CPC ........ *B64C 29/0033* (2013.01); *B64C 11/001* (2013.01); *B64C 27/20* (2013.01)

(58) Field of Classification Search
CPC ......... B64C 11/001; B64C 27/20; B64C 1/34; B64C 3/30; B64D 2033/022; B64D 15/166
See application file for complete search history.

(56) References Cited

U.S. PATENT DOCUMENTS

| | | | |
|---|---|---|---|
| 3,054,578 A | 9/1962 | Marie | |
| 3,083,934 A * | 4/1963 | Vanderlip | B64C 27/20 244/5 |
| 3,285,003 A | 11/1966 | Martin | |
| 3,494,380 A * | 2/1970 | Martin et al. | B64C 29/0091 137/15.1 |
| 3,524,611 A * | 8/1970 | Kurt | B64C 29/0075 244/12.4 |
| 4,843,992 A * | 7/1989 | Babikian | B64C 1/34 114/69 |
| 5,160,248 A | 11/1992 | Clarke | |
| 5,351,913 A | 10/1994 | Cycon et al. | |
| 5,609,314 A | 3/1997 | Rauckhorst, III et al. | |
| 6,575,402 B1 | 6/2003 | Scott | |

(Continued)

OTHER PUBLICATIONS

Amante, William Anthony, et al.; "Ducted Fan Assembly With a Movable Leading Edge"; U.S. Appl. No. 17/036,942, filed Sep. 29, 2020; 43 pages.

(Continued)

*Primary Examiner* — Tien Q Dinh
*Assistant Examiner* — William L Gmoser
(74) *Attorney, Agent, or Firm* — Shackelford, Bowen, McKinley & Norton, LLP

(57) ABSTRACT

In an embodiment, a ducted fan assembly includes a housing that further includes a rotor. The ducted fan assembly also includes a plurality of stators that extend outward from the housing. The ducted fan assembly also includes a control vane pivotally attached to at least one of the plurality of stators. The ducted fan assembly also includes a rim that extends around at least a portion of a perimeter of the ducted fan assembly and is supported by the plurality of stators and the control vane, where the rim defines an opening surrounding at least a portion of the housing.

19 Claims, 4 Drawing Sheets

(56) References Cited

U.S. PATENT DOCUMENTS

| | | | |
|---|---|---|---|
| 9,297,333 | B2 | 3/2016 | Filter |
| 9,975,631 | B1 | 5/2018 | McLaren et al. |
| 10,641,290 | B1 | 5/2020 | Piasecki et al. |
| 10,737,766 | B2 | 8/2020 | Mores et al. |
| 11,472,533 | B2 | 10/2022 | Feeley et al. |
| 11,480,072 | B2 | 10/2022 | Feeley et al. |
| 11,505,313 | B2 | 11/2022 | Bernard et al. |
| 11,548,630 | B2 | 1/2023 | Amante et al. |
| 2006/0032983 | A1 | 2/2006 | Brand et al. |
| 2008/0179448 | A1 | 7/2008 | Layland et al. |
| 2011/0147533 | A1 | 6/2011 | Goossen et al. |
| 2015/0314865 | A1* | 11/2015 | Bermond ................ B64C 27/52 244/17.27 |
| 2017/0341725 | A1 | 11/2017 | Skahan |
| 2018/0208305 | A1 | 7/2018 | Lloyd et al. |
| 2019/0283888 | A1* | 9/2019 | Hines .................... B64D 13/06 |
| 2020/0354051 | A1 | 11/2020 | Besse et al. |

OTHER PUBLICATIONS

Carr, Timothy Brian, et al.; "Ducted Fan Assembly With Blade in Leading Edge"; U.S. Appl. No. 17/037,082, filed Sep. 29, 2020; 38 pages.

Carr, Timothy Brian, et al.; "Ducted Fan Assembly With Material-Filled Cavity in Leading Edge"; U.S. Appl. No. 17/037,190, filed Sep. 29, 2020; 38 pages.

* cited by examiner

DUCTED FAN ASSEMBLY FOR AN AIRCRAFT

TECHNICAL FIELD

The present disclosure relates generally to rotor-driven aircraft and more particularly, but not by way of limitation, to a ducted fan assembly.

BACKGROUND

This section provides background information to facilitate a better understanding of the various aspects of the disclosure. It should be understood that the statements in this section of this document are to be read in this light, and not as admissions of prior art.

Rapid commercial growth and expansion of urban areas often increases the distance from one side of a metropolitan area to another. This rapid commercial growth and expansion often results in an increase in the population, further resulting in more congestion and emissions due to an increased number of vehicles on the current highway infrastructure. As technology further increases, such metropolitan areas will continue to grow, placing serious burden on the current highway infrastructure to handle the increased traffic and furthering the need for improved travel across a metropolitan area that reduces emissions while allowing faster, more convenient, and more efficient travel throughout a metropolitan area and/or between bordering states. One approach is to utilize tiltrotor aircraft to carry people across metropolitan areas. Tiltrotor aircraft are configured to fly in helicopter mode for vertical takeoff and landing (VTOL) and in airplane mode for high-speed flight. These aircraft are preferably compact and light-weight vehicles. As with all commercial aircraft, safety is a primary concern. One safety aspect in consideration is the durability of components of the aircraft, such as the rotor ducts. For example, aircraft sometimes encounter foreign objects (e.g., birds or debris) that may strike a rotor or a rotor duct. To ensure the safety of the occupants of the aircraft, components of the aircraft (e.g., the rotor duct) are designed to withstand strikes from foreign objects.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

In an embodiment, a ducted fan assembly includes a housing that further includes a rotor. The ducted fan assembly also includes a plurality of stators that extend outward from the housing. The ducted fan assembly also includes a control vane pivotally attached to at least one of the plurality of stators. The ducted fan assembly also includes a rim that extends around at least a portion of a perimeter of the ducted fan assembly and is supported by the plurality of stators and the control vane, where the rim defines an opening surrounding at least a portion of the housing.

In an embodiment, a rotorcraft includes a plurality of fan assemblies. Each fan assembly includes a housing that further includes a rotor. Each fan assembly also includes a plurality of stators that extend outward from the housing. Each fan assembly also includes a control vane pivotally attached to at least one of the plurality of stators. Each fan assembly also includes a rim that extends around at least a portion of a perimeter of the fan assembly and is supported by the plurality of stators and the control vane, where the rim defines an opening surrounding at least a portion of the housing. Each fan assembly also includes a leading-edge bladder that is attached to the rim and extends around the at least a portion of a perimeter of the fan assembly to form a leading edge of the fan assembly, the leading-edge bladder configured to be filled with a gas.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various aspects will now be described more fully with reference to the accompanying drawings. The disclosure may, however, be embodied in many different forms and should not be construed as limited to the aspects set forth herein.

Figure 1:
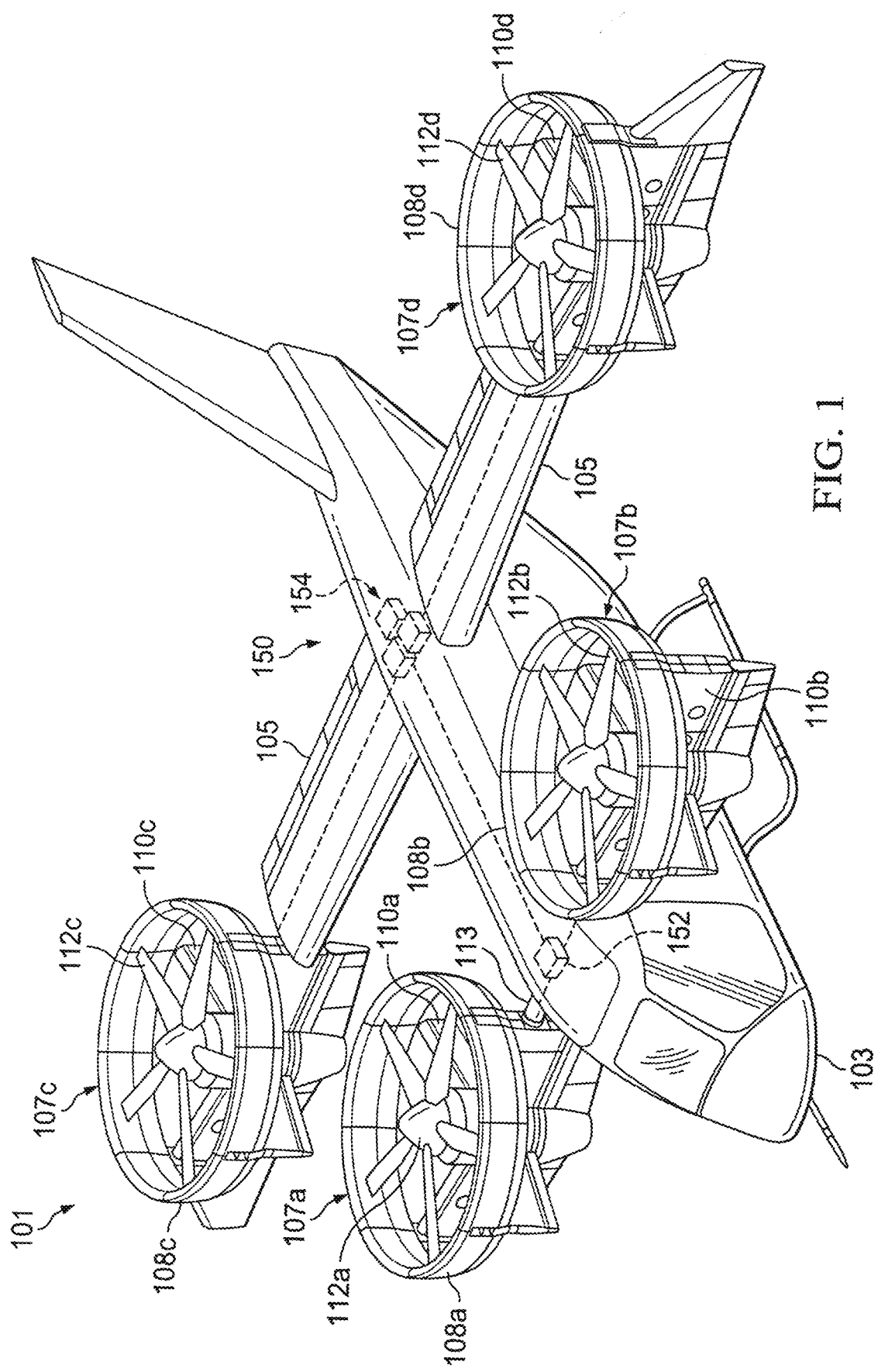
FIG. 1 is a perspective view of an aircraft oriented in a helicopter mode according to aspects of the disclosure.
Figure 2:
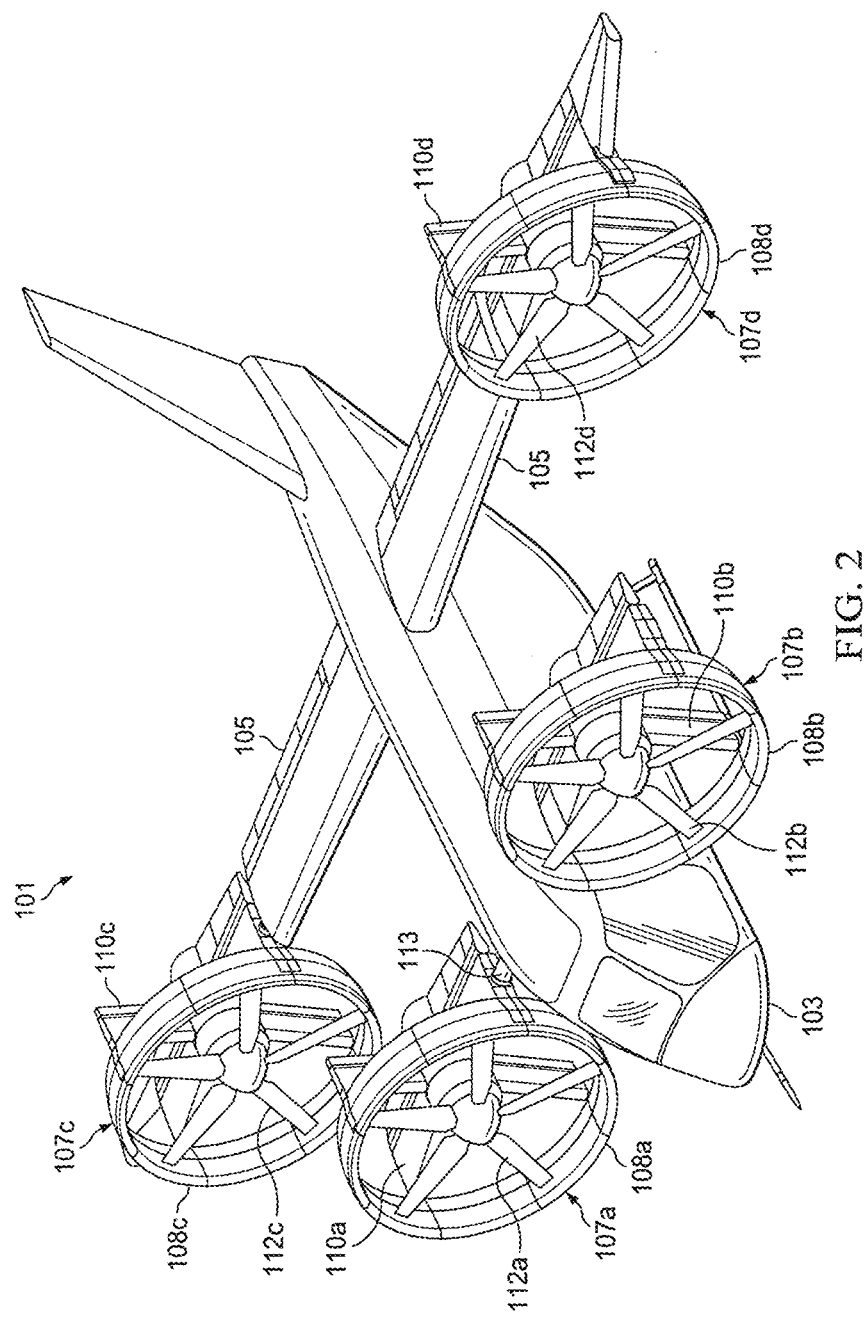
FIG. 2 is a perspective view of an aircraft oriented in an airplane mode according to aspects of the disclosure.

Referring now to FIGS. 1 and 2, perspective views of a rotorcraft 101 operating in helicopter and airplane modes, respectively, are shown according to aspects of the disclosure. Rotorcraft 101 is generally configured as a vertical takeoff and landing (VTOL) aircraft, more specifically a tiltrotor, that is operable in an airplane mode associated with forward flight and a helicopter mode associated with vertical takeoff from and landing to a landing zone. Rotorcraft 101 comprises a fuselage 103 comprising a cockpit and/or passenger compartment, wings 105 extending from the fuselage 103, a pair of ducted fan assemblies 107a, 107b carried by, supported by and/or otherwise coupled to fuselage 103, a pair of ducted fan assemblies 107c, 107d carried by, supported by, and/or otherwise coupled to wings 105. Ducted fan assemblies 107a-107d are arranged about fuselage 103 to be generally coplanar when rotorcraft 101 is in helicopter and airplane modes.

Each ducted fan assembly 107a, 107b is supported by a rotatable shaft or spindle 113 extending at least partially through fuselage 103 and coupled to the pair of ducted fan assemblies 107a, 107b. The pair of ducted fan assemblies 107a, 107b may be selectively rotated with respect to fuselage 103 by at least one actuator (e.g. electric, electro-mechanical, magnetic, and/or hydraulic) in order to transition rotorcraft 101 between the airplane and helicopter modes. Each ducted fan assembly 107a-107d comprises a duct 108a-108d, respectively, with each duct 108a-108d having a plurality of structural supports and/or struts 110a-110d. In some aspects, outer surfaces of the ducts 108 may be shaped to provide optimal and/or preferred flight characteristics in at least one of the airplane mode and the helicopter mode.

Ducted fan assemblies 107a, 107b each include a fan 112a, 112b, respectively. It will be appreciated that fans 112a, 112b rotate in opposing directions with respect to one another to balance the torque generated by each fan 112a, 112b. Each fan 112a, 112b includes plurality of rotor blades. Fans 112a, 112b are disposed within their respective duct 108 and are configured to generate thrust when selectively rotated. As illustrated in FIGS. 1 and 2, each fan 112a, 112b comprises five rotor blades. However, in other aspects, each fan 112a, 112b may comprise two, three, five, six, seven, eight, and/or more rotor blades.

Each wing 105 carries a single ducted fan assembly of the pair of ducted fan assemblies 107c, 107d. The pair of ducted fan assemblies 107c, 107d are supported by a rotatable shaft or spindle (e.g., similar to spindle 113) that extends at least partially through wings 105 and is coupled to the pair of ducted fan assemblies 107c, 107d. The pair of ducted fan assemblies 107c, 107d may be selectively rotated with respect to fuselage 103 by at least one actuator (e.g. electric, electro-mechanical, magnetic, and/or hydraulic) in order to transition rotorcraft 101 between the airplane and helicopter modes. The pair of ducted fan assemblies 107c, 107d are structurally similar to the pair of ducted fan assemblies 107a, 107b and each includes its own duct 108c, 108d, struts 110c, 110d, fans 112c, 112d. Compared to the pair of ducted fan assemblies 107a, 107b, the pair of ducted fan assemblies 107c, 107d are disposed further outboard of fuselage 103.

Rotorcraft 101 is controlled via flight control system 150. Flight control system 150 includes flight control computer 152 that connected to and in communication with propulsion system 154. Propulsion system 154 is controlled by flight control computer 152 and includes components that assist with the flight of rotorcraft 101. Propulsion system 154 may generally include a hybrid electrical system, a hybrid hydraulic system and/or combinations thereof. Flight control computer 152 is configured to selectively control the components of propulsion system 154 to operate rotorcraft 101. Flight control system 150 may include flight control input hardware (e.g. flight controls) configured to receive inputs and/or commands from a pilot to control operation of the rotorcraft 101 and/or a plurality of sensors and/or gauges configured to provide feedback regarding operational characteristics of rotorcraft 101 to the flight control computer 152. Additionally, flight control computer 152 may be configured to selectively control the operation, orientation, rotation, position, and/or rotational speed of the pairs of ducted fan assemblies 107a, 107b and 107c, 107d. In some aspects, flight control system 150 may comprise fly-by-wire architecture for controlling rotorcraft 101. Additionally, in some aspects, flight control system 150 may be capable of optionally-piloted operation. Furthermore, in some aspects, flight control system 150 may comprise collective pitch control for adjusting the pitch of rotor blades 124 and rotational speed control for individually adjusting a rotational speed of rotor systems 122 of each of the ducted fan assemblies 107a-107d, without the need for cyclic control for controlling operation of rotorcraft 101.

Figure 3:
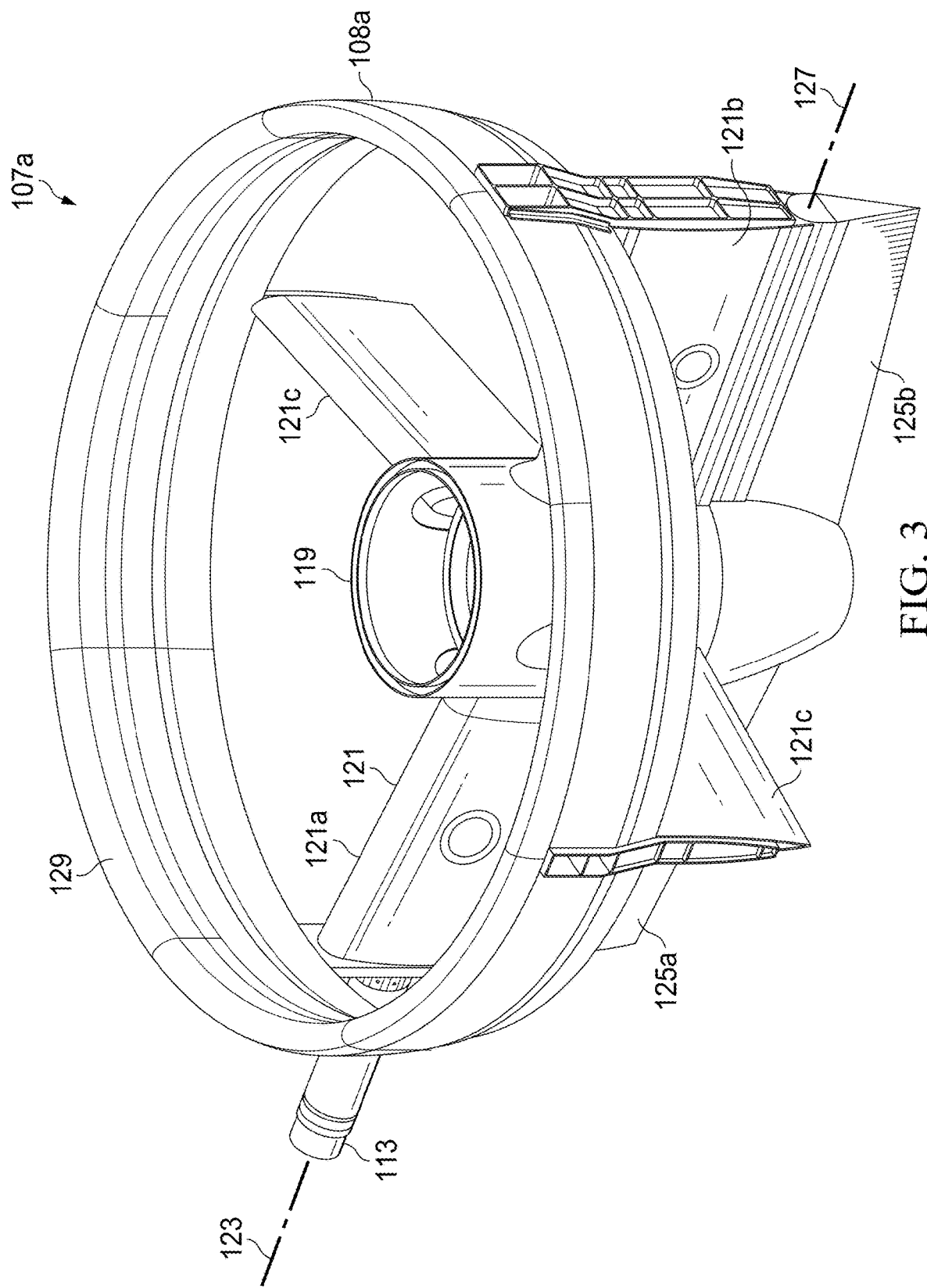
FIG. 3 is a perspective view of a ducted fan assembly according to aspects of the disclosure.

FIG. 3 illustrates ducted fan assembly 107a according to aspects of the disclosure. Ducted fan assembly 107a will be discussed with the understanding that the discussion thereof applies to ducted fan assemblies 107b-107d. Ducted fan assembly 107a is depicted in FIG. 3 without fan 112a. Ducted fan assembly 107a includes duct 108a and a central housing 119 that is configured to support and house components such as a rotor, a gearbox, and/or other components to which fan 112a may be positioned over and attached. Ducted fan assembly 107a further includes a plurality of stators 121 that extend outward from housing 119. In this embodiment, ducted fan assembly 107a includes four stators 121 that extend radially outward from housing 119. More specifically, ducted fan assembly 107a has two primary stators that include an inboard primary stator 121a and an outboard primary stator 121b. Inboard primary stator 121a is configured to be coupled to a corresponding spindle, such as spindle 113. Ducted fan assembly 107a is rotatable about a spindle axis 123 that is defined by spindle 113. Ducted fan assembly 107a includes two secondary stators 121c. Primary inboard and outboard stators 121a, 121b respectively are configured to carry a larger proportion of the load of ducted fan assembly 107a back to fuselage 103 than are secondary stators 121c. Inboard primary stator 121a and outboard primary stator 121b are longitudinally aligned relative to each other on opposed sides of housing 119 and secondary stators 121c are longitudinally aligned relative to each other on opposed sides of housing 119 and aligned perpendicularly to inboard primary stator 121a and outboard primary stator 121b. In this regard, stators 121 are equally spaced about housing 119. It should be appreciated that ducted fan assembly 107 may be alternatively configured with more or fewer stators 121. It should further be appreciated that ducted fan assembly 107a may be alternatively configured with different spacing of stators 121 about housing 119.

Ducted fan assembly 107a further includes an inboard control vane 125a and an outboard control vane 125b, which are pivotally attached to inboard primary stator 121a and outboard primary stator 121b, respectively. Inboard control vane 125a and outboard control vane 125b are pivotable about a vane axis 127 that extends parallel to spindle axis 123. In this embodiment, inboard control vane 125a and outboard control vane 125b are configured to rotate together to facilitate yaw control, changes of direction, turning, etc. during flight of rotorcraft 101. It should be appreciated, however, that inboard control vane 125a and outboard control vane 125b may alternatively be configured to rotate independently from one another. It should further be appreciated that ducted fan assembly 107a is not limited to the illustrated configuration of inboard control vane 125a and outboard control vane 125b. For example, ducted fan assembly 107a may alternatively be configured with more or fewer control vanes, such as a single control vane that defines a continuous control surface. Ducted fan assembly 107a may include a leading edge 129 that forms an aerodynamic outer covering of ducted fan assembly 107a, and that defines an opening that extends through ducted fan assembly 107a. As shown, housing 119 is located primarily aft of the opening. An outer surface of leading edge 129 can include, for example, one or more sections of skin.

Figure 4:
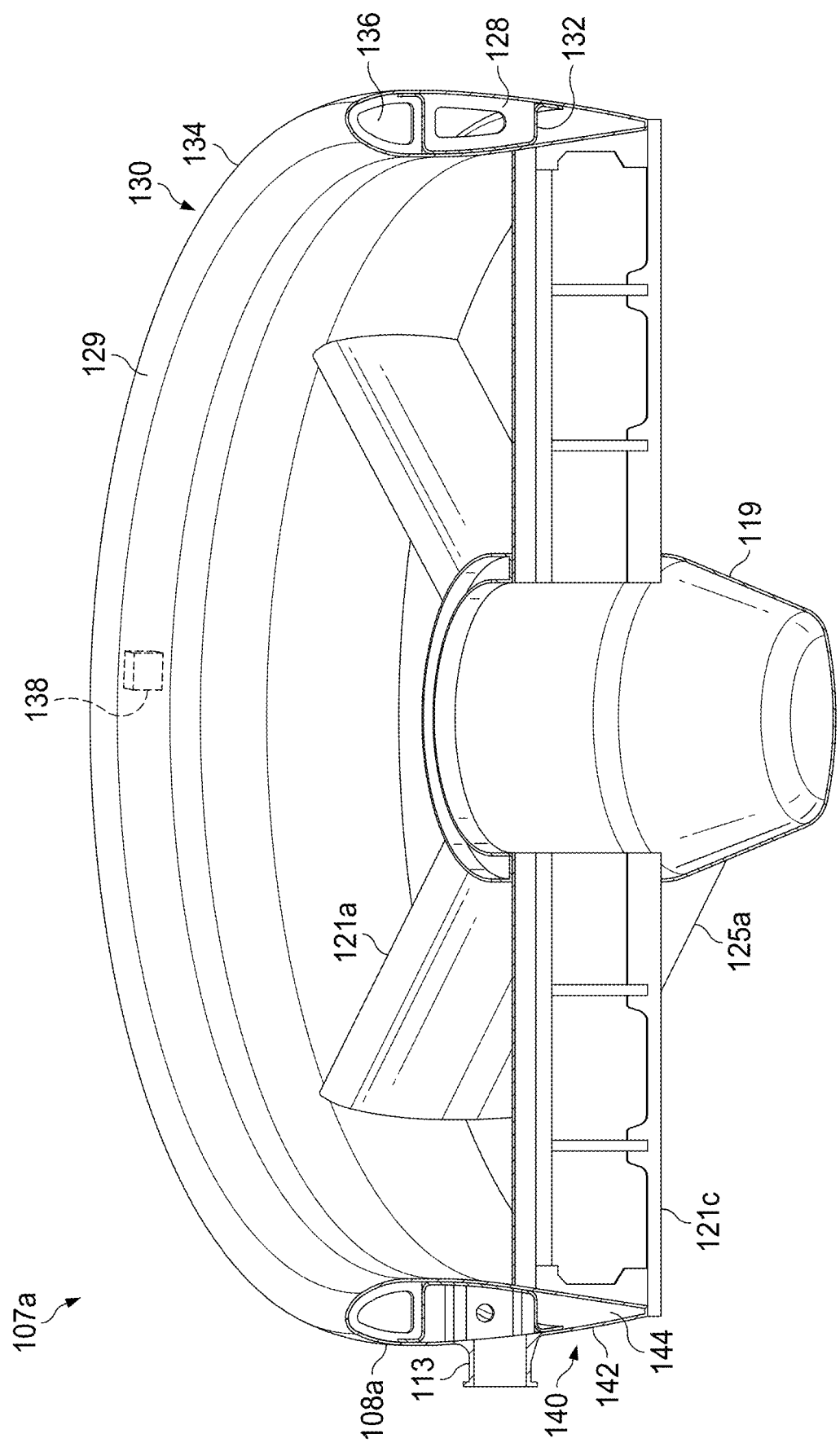
FIG. 4 is a sectioned view of a ducted fan assembly according to aspects of the disclosure.

FIG. 4 is a sectioned view of ducted fan assembly 107a according to aspects of the disclosure. Ducted fan assembly 107a includes a rim 128 that extends around the perimeter of duct 108a and is supported by the plurality of stators 121 and the control vanes 125. Rim 128 provides structure and support for ducted fan assembly 107a. As shown in FIG. 4, rim 128 defines an opening surrounding at least a portion of central housing 119.

A bladder 130 sits on, or is attached to, rim 128 to form leading edge 129. In some aspects, rim 128 includes a frame 132 that in cross-section forms a hat-like shape. Frame 132 reinforces rim 128 and provides additional structure to which bladder 130 may be secured. Rim 128 is positioned within duct 108a to be adjacent to fan 112a. In certain embodiments, rim 128 is made from metals or composites that are more rigid than bladder 130, such that the rim 128 has greater rigidity than bladder 130. In some embodiments, in order to maintain proper spacing between fan 112*a* and duct 108*a*, it is advantageous for at least the portion of duct 108*a* that is adjacent to the tips of fan 112*a* (e.g., its blade tips) be rigid. In a typical aspect, a space between the tips of fan 112*a* and duct 108*a* (e.g., a space between the tips of blades of fan 112*a* and rim 128) is, for example, less than or equal to 0.25 inches.

Bladder 130 includes a carcass 134 that defines a volume 136 therein. Carcass 134 is formed from a pliable material that can deform in the event a foreign object impacts bladder 130 during flight. Allowing bladder 130 to deform attenuates the energy of the strike to minimize or eliminate damage to duct 108*a*. Bladder 130 is rigid enough to provide a desired aerodynamic shape to improve the performance of duct 108*a* (i.e., maintains shape for the efficient flow of air over duct 108*a* to improve the amount of thrust generated by ducted fan assembly 107*a*), but is also pliable enough to absorb and withstand impacts from foreign objects. For example, bladder 130 may be made from various polymers. In some aspects, the polymer is a rubber material and may be reinforced with fibers (e.g., polymers such as nylon and the like). In some aspects, bladder 130 is filled with a gas (e.g., nitrogen as nitrogen is less sensitive to changes in temperature) and sealed. The rigidity of bladder 130 is determined in part by the material carcass 134 is made from and in part by the pressure provided by the gas with which carcass 134 is filled. In some aspects, bladder 130 may include a feature 138, such as a blow-off valve, weakened section of carcass 134, and the like, to bleed off pressure that results from a foreign object impacting bladder 130 during flight.

In the aspect illustrated in FIG. 4, bladder 130 is one contiguous bladder that extends around the entire perimeter of duct 108*a*. In other aspects, bladder 130 includes two or more bladders that together extend around the entire perimeter of duct 108*a*. In the event of a failure of bladder 130 or as a part of maintenance, bladder 130 may be removed from rim 128 for inspection, repair, or replacement. In some aspects, the trailing edge of duct 108*a* may be similarly formed from a bladder 140, where bladder 140 is attached ducted fan assembly 107*a* on a side thereof opposite rim 128. Bladder 140 includes a carcass 142 that defines a volume 144 therein. Similar to bladder 130, bladder 140 provides the structural rigidity needed for efficient flow air around duct 108*a* to provide performance enhancements to ducted fan assembly 107*a* (e.g., increased thrust). In some aspects, bladders 130 and 140 may be formed from a single carcass that attaches to frame 132. This single carcass can include, for example, a middle section that joins bladders 130 and 140 together and wraps around an inside of duct 108*a* adjacent frame 132.

Compared to traditional ducts, which are formed from metal or composites, bladders 130 and 140 offer improved performance regarding impacts by foreign objects. For example, compared to metals and composites, bladders 130 and 140 can more easily retain their shape after an impact event. Retaining shape after an impact event can prevent the loss in performance that occurs when a metal or composite duct is deformed or destroyed by an impact event. Bladders 130 and 140 also provide weight savings compared to conventional duct designs. A further benefit is the ease and low cost with which bladders 130 and 140 can be manufactured.

Depending on the aspect, certain acts, events, or functions of any of the algorithms, methods, or processes described herein can be performed in a different sequence, can be added, merged, or left out altogether (e.g., not all described acts or events are necessary for the practice of the algorithms, methods, or processes). Moreover, in certain aspects, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other aspects are possible in which these tasks are performed by a different entity.

Conditional language used herein, such as, among others, "can," "might," "may," "e.g.," and the like, unless specifically stated otherwise, or otherwise understood within the context as used, is generally intended to convey that certain aspects include, while other aspects do not include, certain features, elements and/or states. Thus, such conditional language is not generally intended to imply that features, elements and/or states are in any way required for one or more aspects or that one or more aspects necessarily include logic for deciding, with or without author input or prompting, whether these features, elements and/or states are included or are to be performed in any particular aspect.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed aspect, the terms "substantially," "approximately," "generally," "generally in the range of," and "about" may be substituted with "within [a percentage] of" what is specified, as understood by a person of ordinary skill in the art. For example, within 1%, 2%, 3%, 5%, and 10% of what is specified herein.

While the above detailed description has shown, described, and pointed out novel features as applied to various aspects, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A ducted fan assembly comprising:
a housing comprising a rotor;
a plurality of stators that extend outward from the housing;
a control vane pivotally attached to at least one of the plurality of stators;
a rim that extends around at least a portion of a perimeter of the ducted fan assembly and is supported by the plurality of stators and the control vane, wherein the rim defines an opening surrounding at least a portion of the housing;
wherein the control vane is positioned aft of the rim;
wherein an outer edge of the control vane is coextensive with the rim in a direction perpendicular to a rotational plane of the rotor; and
a leading-edge bladder comprising a carcass and that is attached to the rim and extends around the at least a portion of a perimeter of the ducted fan assembly to form a leading edge of the ducted fan assembly, the leading-edge bladder configured to be filled with a gas;

wherein the carcass comprises a weakened section configured to bleed off pressure resulting from impact with a foreign object.

2. The ducted fan assembly of claim 1, wherein the rim has greater rigidity than the leading-edge bladder.

3. The ducted fan assembly of claim 1, wherein:
the rim comprises a frame made from at least one of a metal and a composite; and
the leading-edge bladder comprises a rubber polymer.

4. The ducted fan assembly of claim 3, wherein the rubber polymer is reinforced with a fiber.

5. The ducted fan assembly of claim 1, comprising a trailing-edge bladder that is attached to the ducted fan assembly on a side thereof opposite the rim such that the trailing-edge bladder forms a trailing edge of the ducted fan assembly, the trailing-edge bladder configured to be filled with a gas.

6. The ducted fan assembly of claim 5, comprising a middle section that joins the leading-edge bladder and the trailing-edge bladder.

7. The ducted fan assembly of claim 1, wherein the leading-edge bladder comprises a blow-off valve configured to bleed off pressure resulting from impact with a foreign object.

8. The ducted fan assembly of claim 1, wherein the leading-edge bladder comprises a plurality of bladders that together extend around the at least a portion of a perimeter of the ducted fan assembly.

9. The ducted fan assembly of claim 1, wherein the leading-edge bladder comprises a single contiguous bladder that extends around the at least a portion of a perimeter of the ducted fan assembly.

10. The ducted fan assembly of claim 1, comprising a fan positioned over the housing and attached to the rotor, wherein the fan is adjacent to the rim such that the opening defined by the rim surrounds the fan.

11. The ducted fan assembly of claim 10, wherein the fan comprises a plurality of blades that are each spaced from the rim such that, for each blade of the plurality of blades, a space between the blade and the rim is less than or equal to 0.25 inches.

12. A rotorcraft comprising a plurality of fan assemblies, each fan assembly comprising:
a housing comprising a rotor;
a plurality of stators that extend outward from the housing;
a control vane pivotally attached to at least one of the plurality of stators;
a rim that extends around at least a portion of a perimeter of the fan assembly and is supported by the plurality of stators and the control vane, wherein the rim defines an opening surrounding at least a portion of the housing;
a leading-edge bladder comprising a carcass and that is attached to the rim and extends around the at least a portion of a perimeter of the fan assembly to form a leading edge of the fan assembly, the leading-edge bladder configured to be filled with a gas;
wherein the control vane is positioned aft of the rim;
wherein an outer edge of the control vane is coextensive with the rim in a direction perpendicular to a rotational plane of the rotor; and
wherein the carcass comprises a weakened section configured to bleed off pressure resulting from impact with a foreign object.

13. The rotorcraft of claim 12, wherein, for at least one fan assembly of the plurality of fan assemblies, the rim has greater rigidity than the leading-edge bladder.

14. The rotorcraft of claim 12, wherein, for at least one fan assembly of the plurality of fan assemblies:
the rim comprises a frame made from at least one of a metal and a composite; and
the leading-edge bladder comprises a rubber polymer.

15. The rotorcraft of claim 12, wherein each fan assembly of the plurality of fan assemblies comprises a trailing-edge bladder that is attached to the fan assembly on a side thereof opposite the rim such that the trailing-edge bladder forms a trailing edge of the fan assembly, the trailing-edge bladder configured to be filled with a gas.

16. The rotorcraft of claim 12, wherein each fan assembly of the plurality of fan assemblies comprises a fan positioned over the housing and attached to the rotor, and wherein the fan is adjacent to the rim such that the opening defined by the rim surrounds the fan.

17. The rotorcraft of claim 16, wherein, for each fan assembly of the plurality of fan assemblies, the fan comprises a plurality of blades that are each spaced from the rim such that, for each blade of the plurality of blades, a space between the blade and the rim is less than or equal to 0.25 inches.

18. The rotorcraft of claim 12, wherein, for at least one fan assembly of the plurality of fan assemblies, the leading-edge bladder comprises a single contiguous bladder that extends around the at least a portion of a perimeter of the fan assembly.

19. The rotorcraft of claim 12, at least one fan assembly of the plurality of fan assemblies comprising a trailing-edge bladder that is attached to the at least one fan assembly on a side thereof opposite the rim such that the trailing-edge bladder forms a trailing edge of the at least one fan assembly, the trailing-edge bladder configured to be filled with a gas.

* * * * *